United States Patent [19]

Lee

[11] Patent Number: 5,572,903

[45] Date of Patent: Nov. 12, 1996

[54] SHAKER FOR COT, STROLLER AND BABY CARRIAGE

[76] Inventor: Yun S. Lee, 56, Min Sheng Street, Fengyuan, Taichung, Taiwan

[21] Appl. No.: 488,750

[22] Filed: Jun. 5, 1995

[51] Int. Cl.[6] ............ F16H 21/20; F16H 21/32; A47D 9/02

[52] U.S. Cl. ............ 74/44; 5/108; 5/109; 180/166; 248/362; 297/260.2; 280/87.051; 601/90; 601/98

[58] Field of Search ............ 5/108, 109; 74/44; 180/166; 248/362; 280/87.051; 297/260.2; 601/90, 98

[56] References Cited

U.S. PATENT DOCUMENTS

| 1,999,957 | 4/1935 | Chlupsa | 74/44 X |
| 2,566,983 | 9/1951 | Coltrane | 180/166 X |
| 3,801,003 | 4/1974 | Laureti | 5/108 |
| 3,878,573 | 4/1975 | Boudewyn | 248/362 |
| 5,366,231 | 11/1994 | Hung | 188/5 X |

FOREIGN PATENT DOCUMENTS

| 2405674 | 6/1979 | France | 5/108 |
| 2552808 | 6/1977 | Germany | 180/166 |
| 128875 | 11/1928 | Switzerland | 180/166 |

Primary Examiner—Allan D. Herrmann

[57] ABSTRACT

A shaker for cots, strollers and baby carriages has a clamping unit, a reciprocating unit, a crank unit and a power unit. The clamping unit connects the reciprocating unit via a lever. The reciprocating unit has a reciprocating rod and a rod sleeve. The rear portion of the reciprocating rod is positioned in the rod sleeve adjustably. The crank unit has a front link which connects the rod sleeve and a rear link which connects a motor.

5 Claims, 9 Drawing Sheets

FIG.7

SHAKER FOR COT, STROLLER AND BABY CARRIAGE

BACKGROUND OF THE INVENTION

The invention relates to a shaker for cots, strollers and baby carriages. More particularly, the invention relates to a shaker for cradles, pushchairs, play pens and pendent cradles.

Conventional shakers for baby beds are hidden type shakers which are hidden under a pendent cradle. The shaker has an electric motor which contains an electromagnet as a dynamic power. However, the leakage of electric current may cause sparking and short circuit so that the electric motor and the cradle will be burned. The baby may get an electric shock also.

SUMMARY OF THE INVENTION

An object of the invention is to provide a shaker for shaking cots, strollers, cradles, pushchairs, play pens, baby carriages and pendent cradles.

Another object of the invention is to provide a shaker for shaking cots, strollers and baby carriages with safety assurance.

In accordance with the invention, the shaker has a small volume so that the shaker is easily stored. The electric parts of the shaker are carefully protected to avoid electric leakage.

DETAILED DESCRIPTION OF THE INVENTION

Figure 1:
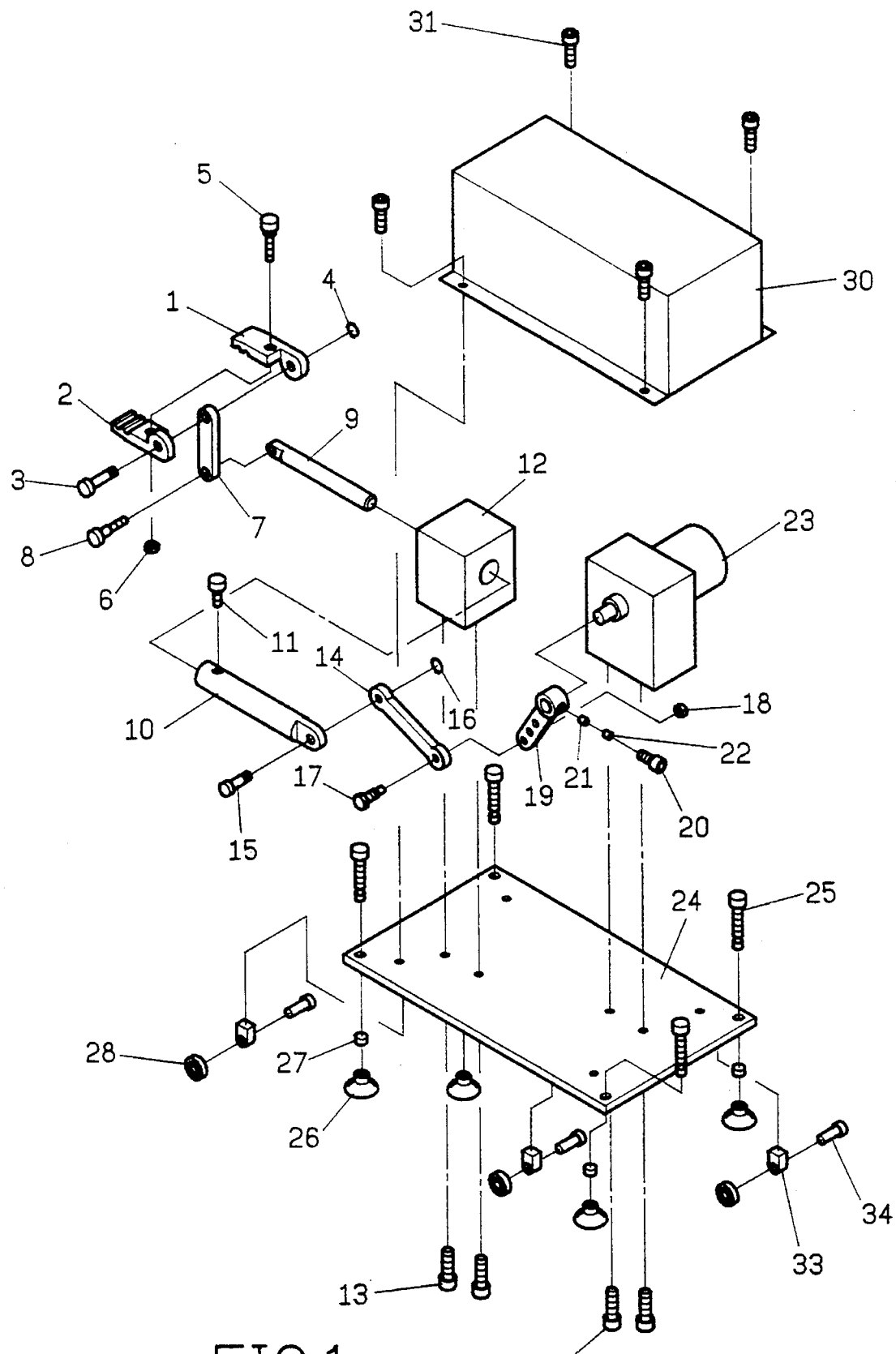
FIG. 1 is an exploded view of a shaker in accordance with the invention.
Figure 2:
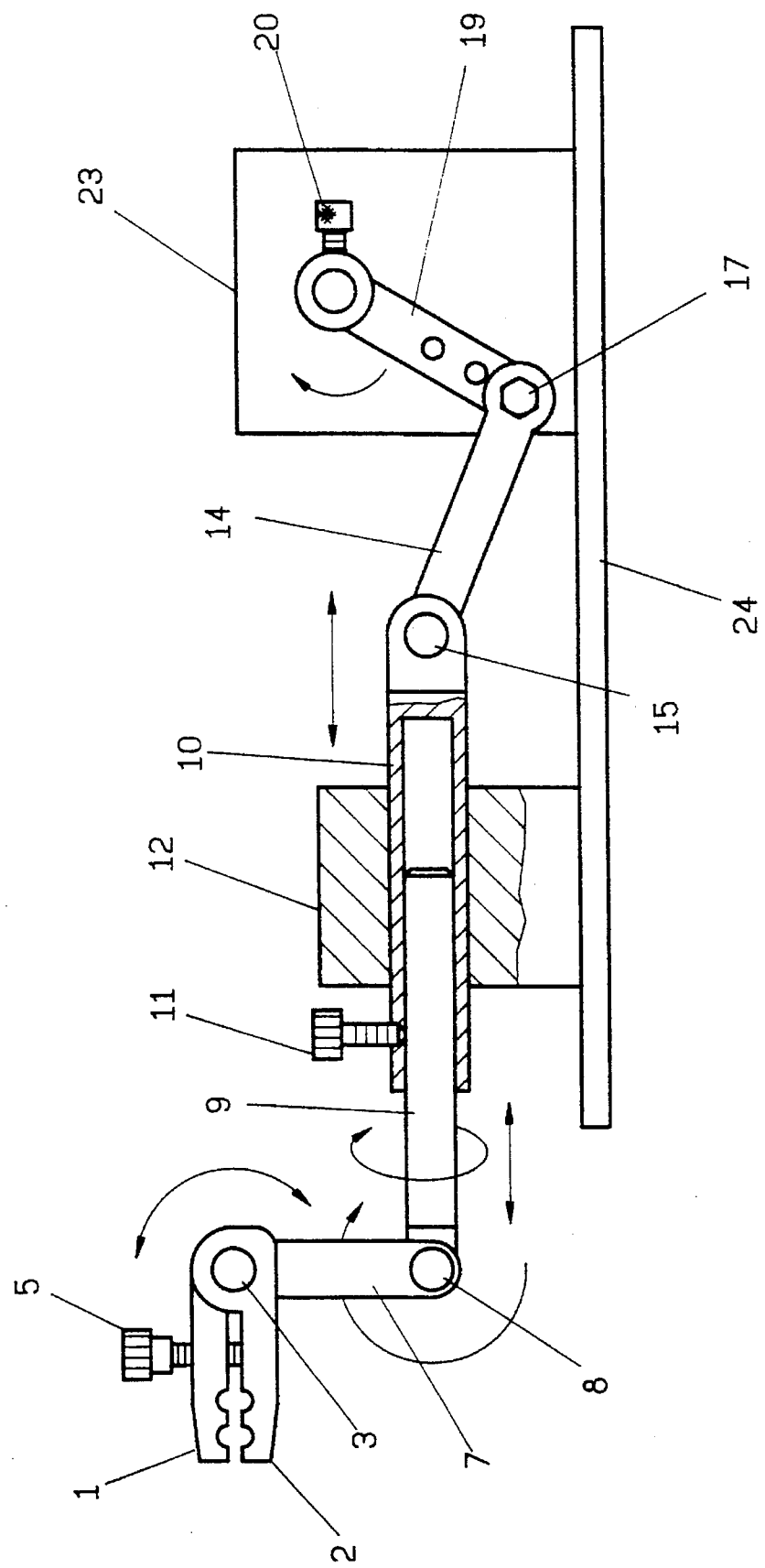
FIG. 2 is a side, partly cross-sectional view of a preferred embodiment in accordance with the invention.

Referring to FIGS. 1 and 2, a shaker has a clamping unit, a reciprocating unit, a crank unit and a power unit. The clamping unit has a front jaw 1, a corresponding rear jaw 2, a lever 7 connecting the jaws 1 and 2 and a reciprocating rod 9. A stud 5 which passes through the middle portions of the jaws 1 and 2 are screwed by a nut 6. A pin 3 passes through a generally U-shaped retaining ring 4, near the portion of the rear jaw 2, the upper portion of the lever 7 and the rear portion of the front jaw 1. A screw 8 passes through the lower portion of the lever 7 and the front portion of the reciprocating rod 9. The reciprocating unit has a reciprocating rod 9, a rod sleeve 10 and a sleeve seat 12. The rear portion of the reciprocating rod 9 is inserted in the sleeve 10. A positioning screw 11 passes the front periphery of the sleeve 10 to adjust the length of the rod 9. The rear portion of the sleeve 10 passes through the central hole of the seat 12. Two screws 13 position the seat 12 on a bottom plate 24. The crank unit has a front link 14 and a rear link 19 with a plurality of holes thereon. A pin 15 passes a generally U-shaped retaining ring 16, the rear portion of the sleeve 10 and the front portion of the front link 14. The rear portion of the front link 14 and the front portion of the rear link 19 are connected by a hexagonal screw 17 and a nut 18. The rear portion of the rear link 19 has a blind hole to receive a copper block 22, a PU (polyurethane) ring 21 in order to connect an axle of a retarding motor 23 with a positioning screw 20. The power unit has a retarding motor 23 with an axle. The motor 23 is fixed on the bottom plate 24 by two screws 32.

Figure 3:
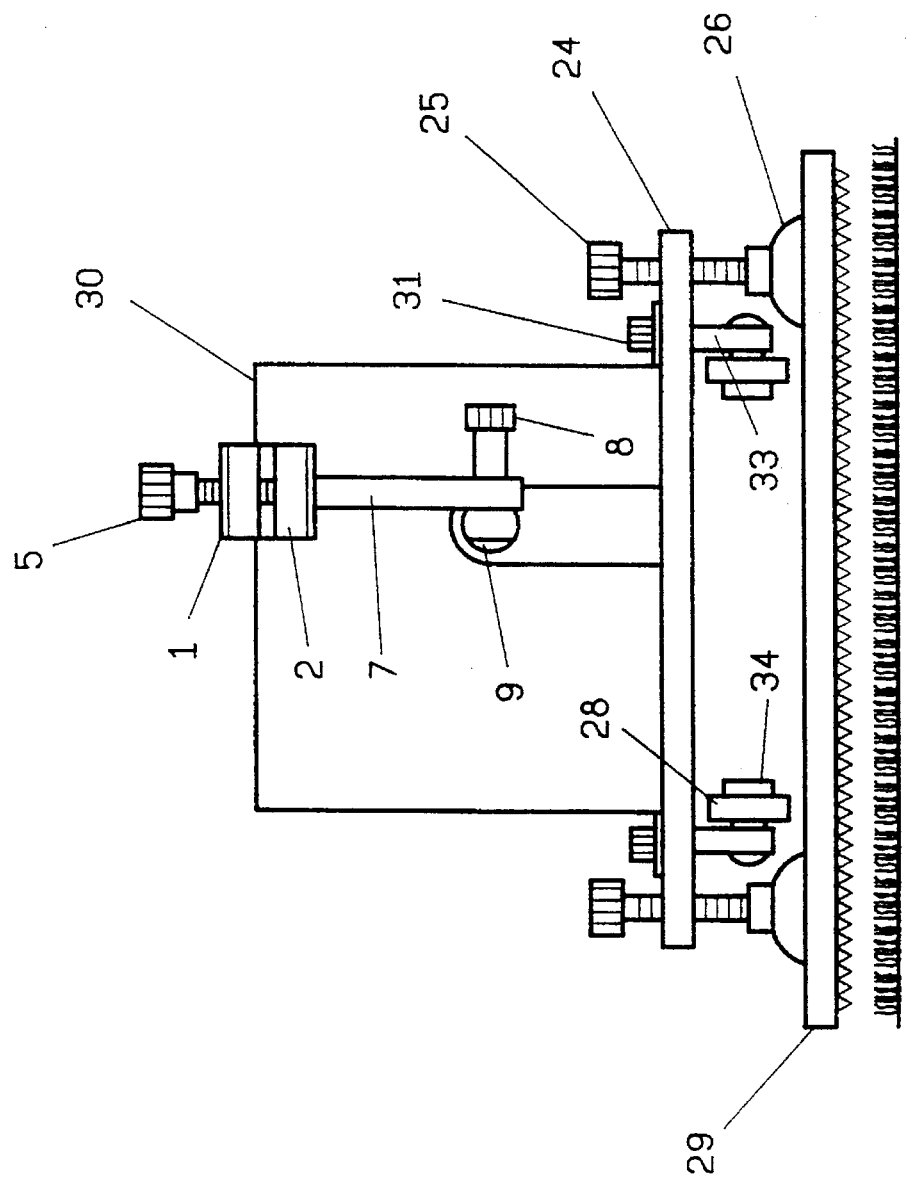
FIG. 3 is a side plan view of a shaker with a positioning plate.
Figure 4:
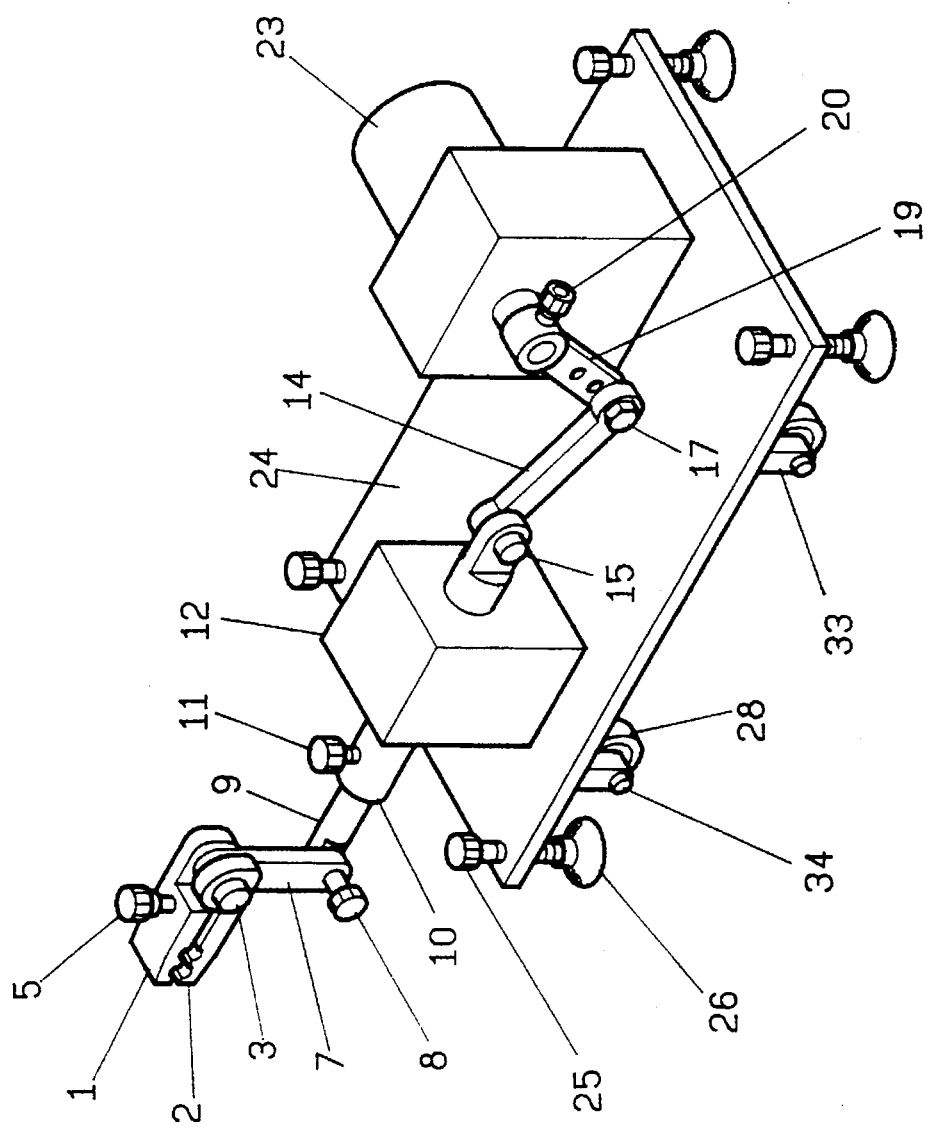
FIG. 4 is a perspective assembly view of FIG. 1 without the casing.
Figure 6:
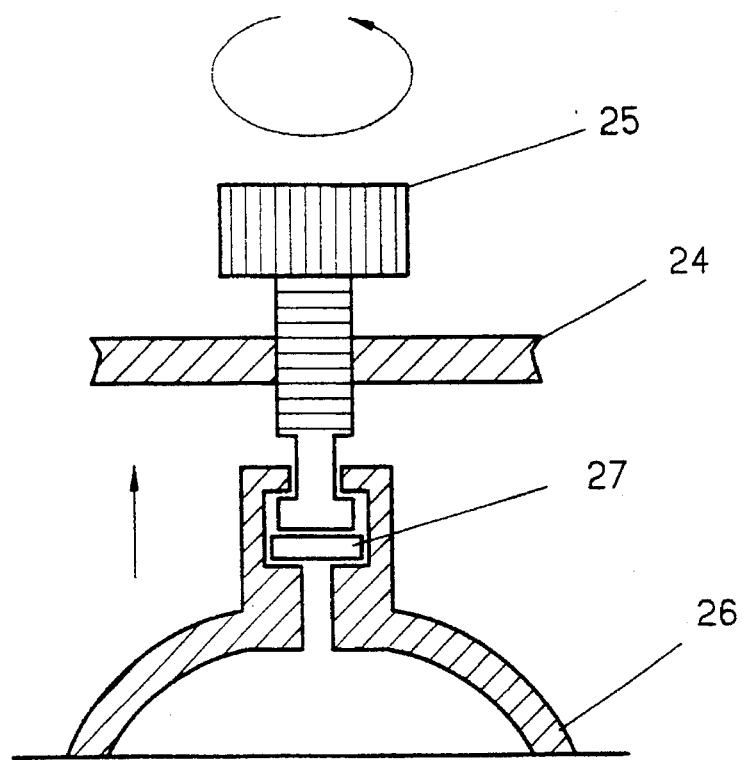
FIG. 6 illustrates the loosening state of a sucking disc.
Figure 5:
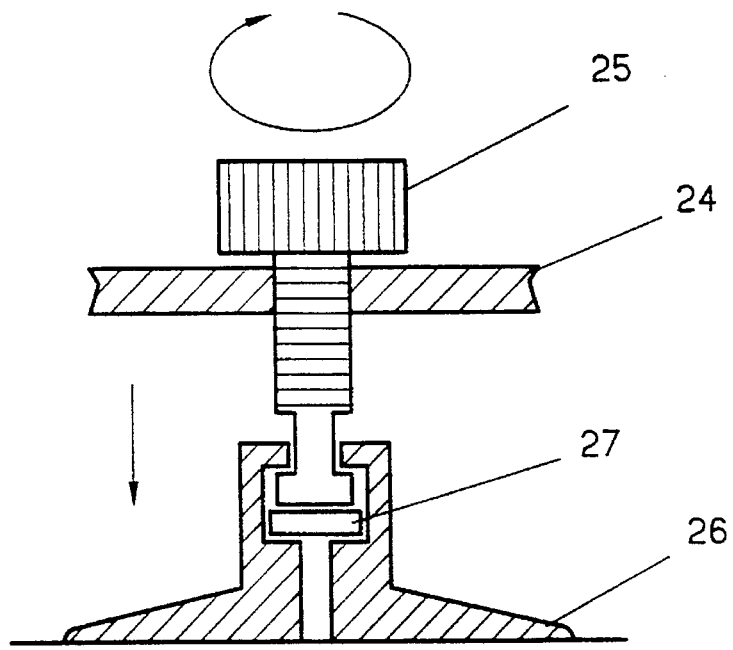
FIG. 5 illustrates the tightening state of a sucking disc.

Referring to FIGS. 3 and 4, four wheels 28 and four sucking discs 26 are disposed under the bottom plate 24. Each wheel 28 is connected to a wheel support 33 which is protruded under the bottom plate 24 via a rivet 34. Each sucking disc 26 is connected to the bottom plate 24 via an adjusting bolt 25. The adjusting bolt 25 can adjust the height of the bottom plate 24. As shown in FIGS. 5 and 6, the packing 27 in the sucking disc 26 is pressed by the bolt 25 so that the interior of the disc 26 is reduced until the disc 26 touches a positioning plate 29 so that the interior of the disc 26 is vacuum. The wheels 28 or the sucking discs 26 can touch the ground or the positioning plate 29. When the sucking discs 26 are adjusted to the position which is lower than the position of the wheels 28, the sucking discs 26 will touch the positioning plate 29. The bottom surface of the positioning plate 29 has a plurality of teeth. The casing 30 covers the shaker except the clamping unit and a portion of the reciprocating unit. Four hexagonal screws 31 at the four corners of the casing 30 position the casing 30 on the bottom plate 24.

Figure 10:
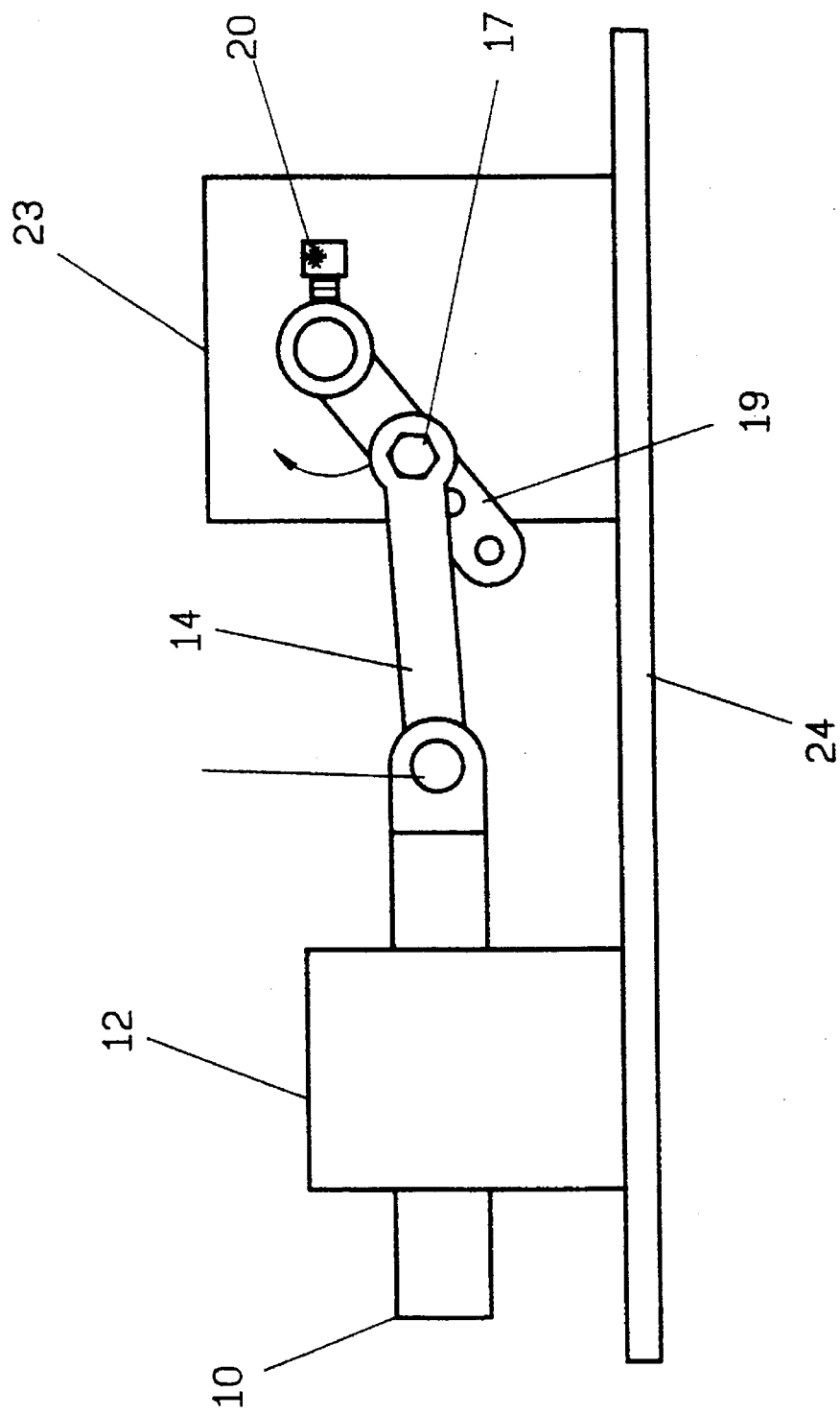
FIG. 10 illustrates the adjusting holes on the rear link.

Referring to FIG. 10, three holes are formed on the rear link 19 to adjust the length of the rear link 19.

Referring to FIG. 2, the jaws 1 and 2, the lever 7 and the rod 9 can rotate 360°, respectively.

Figure 7:
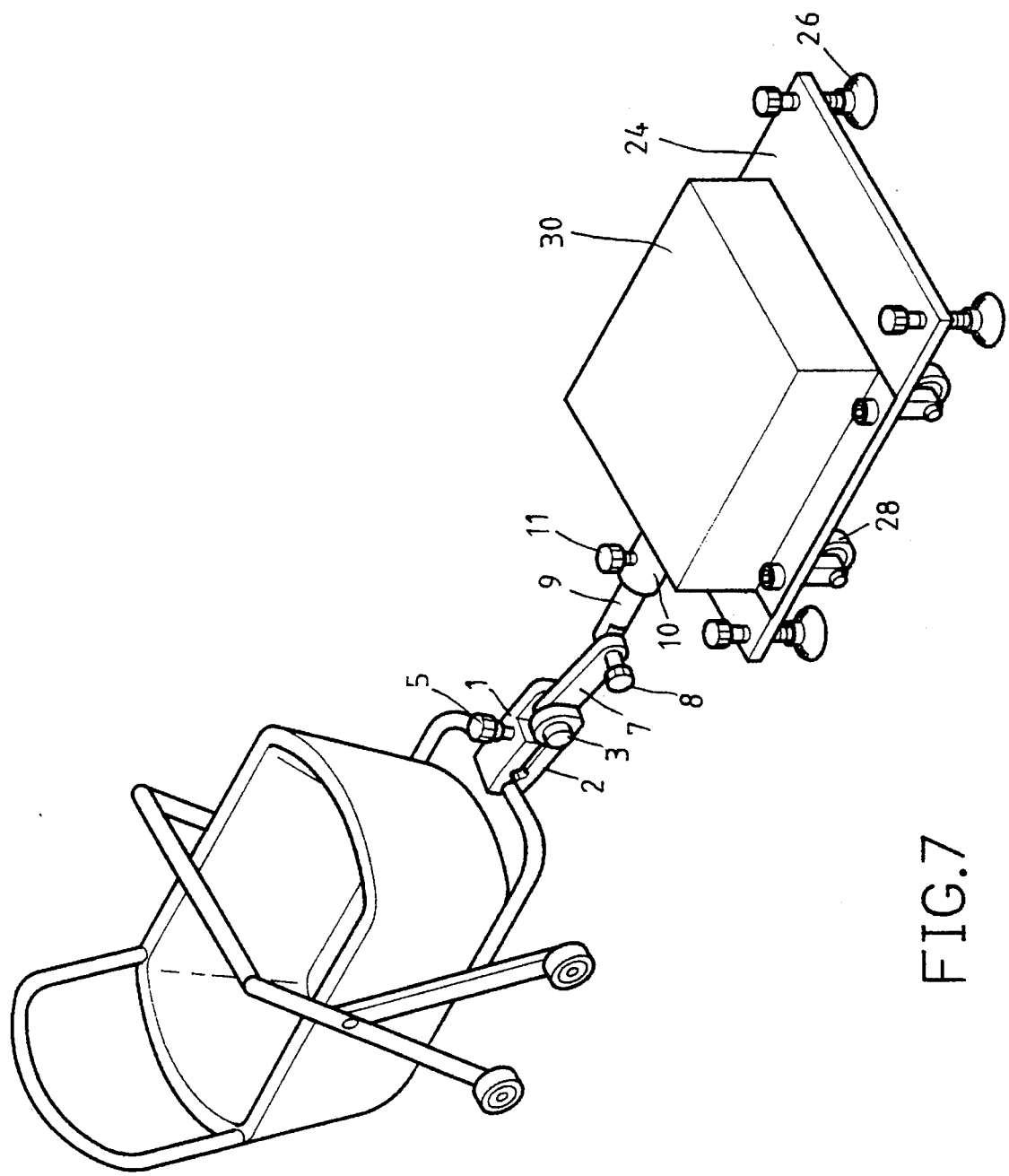
FIG. 7 illustrates the connection of a shaker and a pushchair.
Figure 8:
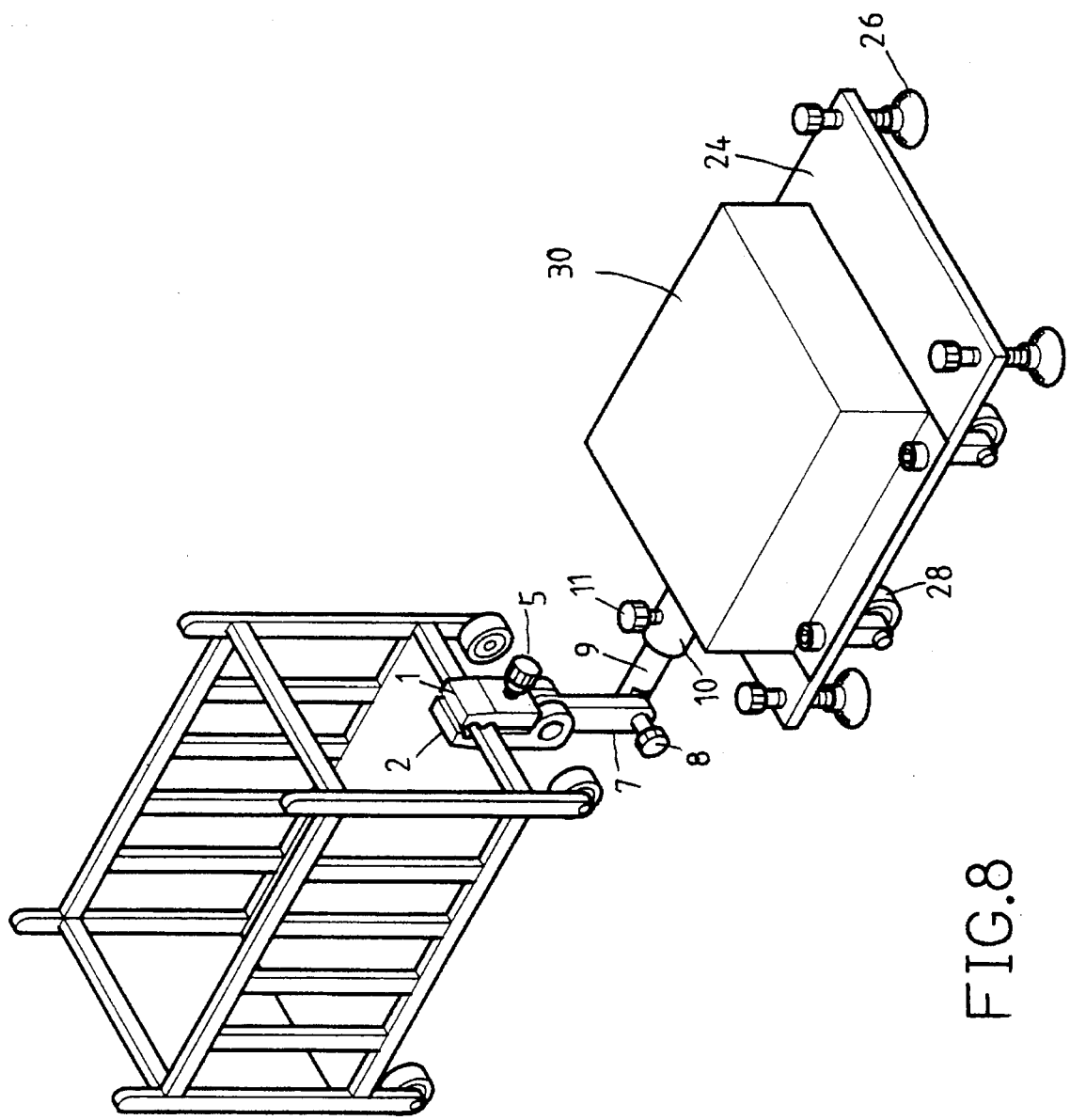
FIG. 8 illustrates the connection of a shaker and a cot.
Figure 9:
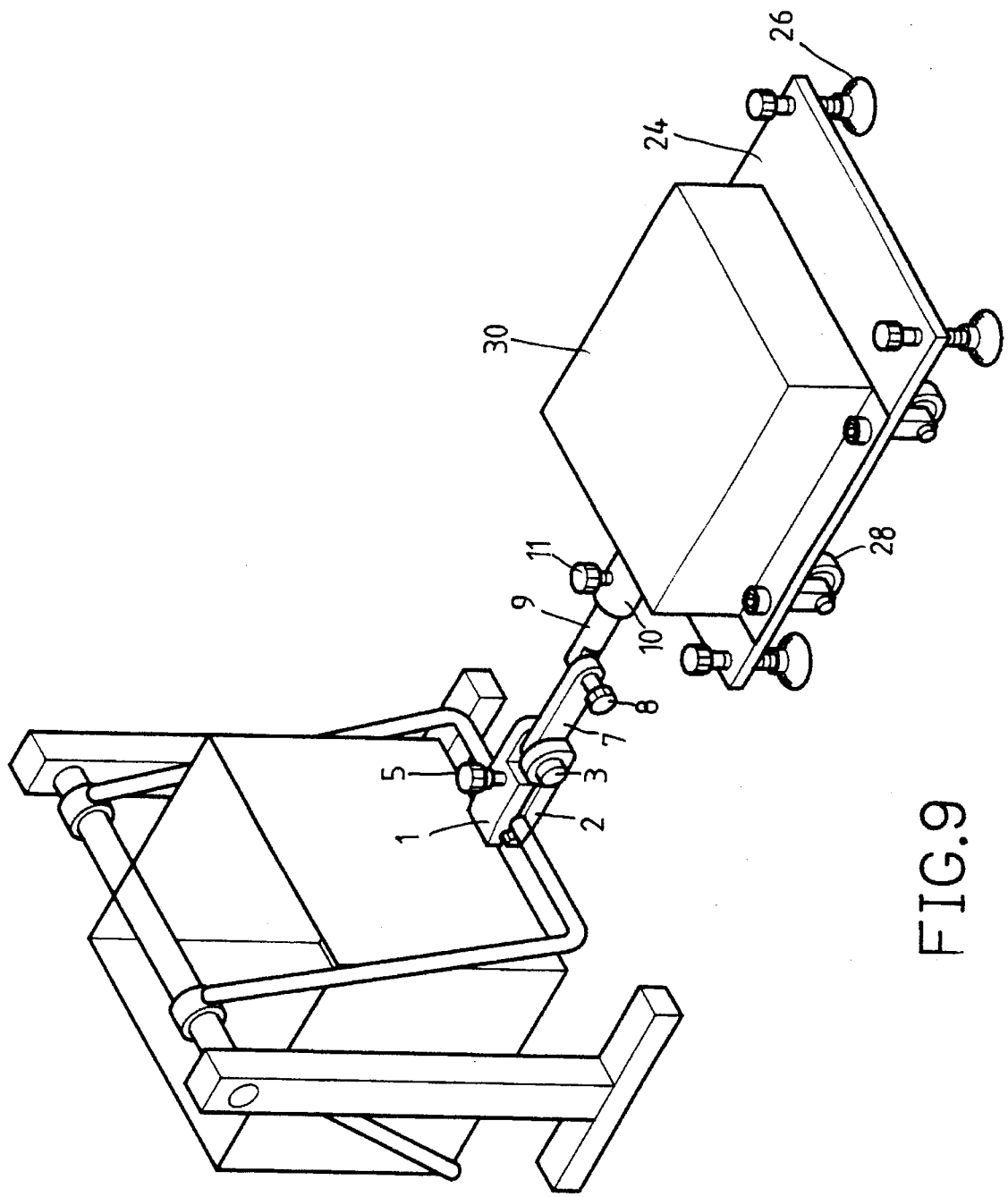
FIG. 9 illustrates the connection of a shaker and a pendent craddle.

Referring to FIGS. 7 to 9, the shaker can shake a pushchair, a cot and a pendent craddle, respectively.

What is claimed is:

1. A shaker for cots, strollers and baby carriages having:

a clamping unit which has a front jaw, a corresponding rear jaw, and a lever;

a reciprocating unit which has a reciprocating rod and a rod sleeve, a rear portion of said reciprocating rod being positioned in said rod sleeve adjustably;

a crank unit which has a front link and a rear link;

a power unit which has a motor with an axle;

a bottom plate;

said two jaws being positioned on a top portion of said lever pivotedly;

a lower portion of said lever connected to a front portion of said reciprocating rod via a screw;

a sleeve seat which is positioned on said bottom plate supporting said rod sleeve;

a rear portion of said rod sleeve connected to a front portion of said front link via a pin;

a rear portion of said front link connected to a front portion of said rear link via a hexagonal screw;

a rear portion of said rear link connected to said axle of said motor pivotedly; and a plurality of wheels disposed beneath said bottom plate.

2. A shaker as claimed in claim 1, wherein said bottom plate has a plurality of sucking discs therebeneath.

3. A shaker as claimed in claim 1, wherein a positioning plate is disposed beneath said wheels.

4. A shaker as claimed in claim 1, wherein said rear link has a plurality of through holes thereon.

5. A shaker as claimed in claim 2, wherein an adjusting bolt is disposed on a top portion of said sucking disc, and wherein an interior of said sucking disc is vacuum while said bolt is tightened.

* * * * *